Patented July 11, 1933

1,917,937

UNITED STATES PATENT OFFICE

STUART JACKSON HAYES, OF LUDLOW, MASSACHUSETTS, ASSIGNOR TO LUDLOW MANUFACTURING ASSOCIATES, OF LUDLOW, MASSACHUSETTS, A MASSACHUSETTS TRUST

FISH NET

No Drawing.   Application filed July 29, 1931.   Serial No. 553,298.

This invention relates to the preservation of fish nets, and particularly of gill nets, and includes improvements in the method of preservation of such nets, as well as in the preserved nets themselves.

The rapid deterioration and resulting replacement costs of fishing nets has resulted in efforts to find a satisfactory preservative treatment. A great deal of work has been done by the United States Bureau of Fisheries on the problem, and the results described in the bulletins of that Bureau. Tar has been extensively used as a preservative but it stiffens the nets and this is objectionable in the case of gill nets where it is important to leave the fabric or web soft and pliable and capable of flattening when struck by fish. Copper oleate has also been proposed and used as a fish net preservative, but if used in high concentrations it makes the threads of the gill nets too stiff for satisfactory gilling, while if the concentration is reduced to the point where the gilling has a satisfactory limber, the protection is insufficient.

I have found that fish nets, and particularly gill nets, can be satisfactorily preserved by the combined use of a suitable disinfectant and of a suitable waterproofing agent, so that the disinfectant is protected from too rapid diffusion by the application of the waterproofing compound. The gill netting which is preserved in this way contains an effective disinfectant that retards or prevents micro-organisms from damaging the fiber substance, together with a layer of a water-repellent substance deposited on or in the fibers of the netting which prevents or effectively retards the dissolving or washing off of the disinfectant from the fibers.

The use of a disinfectant alone is only temporarily effective because of the relatively rapid washing away of the disinfectant by the water in which the net is used, and it is important that the netting should be effectively preserved over a relatively long period of time. So also, the use of a waterproofing material alone is not effective as a preservative. Substances which, like copper oleate, combine both a disinfectant and a waterproofing action are not satisfactory in practice because the copper concentration in the copper soap in quantities which will not stiffen the net to an objectionable extent is too low to act as an effective disinfectant.

But I have found that the desired results can be obtained by applying a disinfectant to the fibers of the netting, which disinfectant is effective to resist the rotting of the fibers, and by preventing the disinfectant from rapidly washing away in the water by applying a waterproofing substance to prevent the solvent action or at least so delay it that the disinfectant will remain on the threads in effective quantities for the desired long period of time, usually until the net fails by natural wear and tear, although in some instances further applications of the preservative treatment may be made before the end of the effective life of the net.

While the invention, in some of its broader aspects, is of more or less general application to the preservation of nets and netting, the invention is of particular value as applied to boiled flax yarns and threads and to gill nettings which are commonly made from such yarns or threads. It is important, in gill nettings, that the netting should not be stiffened to an objectionable extent, but should remain soft and pliable and capable of flattening when struck by fish. The process of the present invention is well adapted for the preservation of gill netting to impart to such netting a high degree of preservation while leaving the fabric with the desired soft and pliable character.

The disinfectants which are employed in the present process are disinfectants which of themselves would not remain on the fiber in sufficient concentration for the required length of time but which nevertheless are effective disinfectants for preventing or retarding the growth of micro-organisms and destruction or rotting of the fibers thereby. Disinfectants which themselves are of very limited solubility, but which nevertheless have the desired disinfecting and preservative action, are more advantageous than the more readily soluble disinfectants because less solid matter need be deposited on the fiber to give long protection, unless the more soluble disinfectants are so perfectly protected by the waterproofing material that they nevertheless remain on or in the fiber to preserve it for the necessary prolonged period of time. A disinfectant which I have found particularly valuable is thymol. Other phenolic disinfectants, particularly phenolic substances of limited solubility but effective disinfecting action such as salicyl anilide, phenyl salycitate, sodium phenate, hexyl resorcinol and some of the other higher alkyl resorcinols, can be employed. The amount of the disinfectant employed will vary somewhat with the disinfectants but should be sufficient to protect the netting against objectionable deterioration or rotting.

The waterproofing substances employed in conjunction with the disinfectant should be substances which impart water resistance to the fibers without objectionable stiffening of the fibers. While various waterproofing or water-repellant substances can be employed, I consider certain metallic soaps, such as aluminum soap, particularly advantageous. Soaps of lead, iron, etc. can be employed but I consider them less desirable than aluminum soap because the former metals impart dark colors and are heavy. The soaps may be soaps of the common fatty acids such as the oleates, stearates, palmitates, etc., or soaps of resin acids, etc. The amount of the waterproofing agent employed should be sufficient to impart the desired water resistance or water-repelling properties but should not be sufficient to stiffen the netting nor deprive it of the desired soft and pliable properties.

In applying the disinfectant and the waterproofing compounds, it is possible to apply them at the same time, and by a single operation. For example, using thymol as the disinfectant and aluminum palmitate as the waterproofing agent, these substances may be dissolved in a suitable solvent such as gasoline and employed for impregnation of the netting, followed by wringing and drying.

As an example of this method of treating the netting, one part by weight of thymol may be dissolved in 100 parts by weight of gasoline, with stirring until solution takes place, and 2 parts by weight of aluminum palmitate then added and stirred until dissolved. The resulting dispersion looks like a perfect solution until it has a chance to set, when it sets as a rather viscous fluid with a thickness comparable to that of molasses but not sticky. Netting immersed in this material either in the form of the finished netting or in the form of thread which is to be used for netting becomes completely impregnated and dries out quickly retaining, for example around 1½% of solids of which about ½% by weight is thymol and about 1% by weight is aluminum palmitate. After being immersed the excess of liquid can be removed by passing thru a wringer, leaving the netting or thread with about 100% of its weight of the immersing fluid, which, upon evaporation of the gasoline, leaves an amount of the disinfectant and waterproofing agent such as above indicated.

Finely ground mixtures of solid thymol and aluminum palmitate can be made and added to a solvent such as gasoline for use in impregnating the netting.

Instead of combining the application of the disinfectants and of the waterproofing agents, I consider it more advantageous to carry out the operation in two stages, preferably during the manufacture of the thread from which the netting is to be made, with the application first of a soluble soap and of the disinfectant, for example, using an intimate emulsion of thymol in a dilute soluble soap solution, and by subsequent treatment of the thus impregnated thread or netting with an aluminum salt solution which will precipitate the insoluble aluminum soap in the fiber. In this way a protective layer of the aluminum soap is developed from the soluble soap after the thymol has been applied in intimate dispersion and suspension in the soluble soap solution.

The first impregnating mixture, when the process is carried out in this way, can be made by taking a 10% solution in water of an ordinary chipped soap (such as the fatty oil soaps used by dyers), letting it cool to about 50° C., and adding about 5% of finely powdered thymol, with stirring until the thymol is melted. The thymol will rise as an oily layer on the top of the soap suspension. When the mixture is nearly cool, but before the thymol crystallizes, it is stirred violently for a few minutes until a creamy colloidal suspension is obtained which can be diluted to the equivalent of about 2% soap concentration for use in the impregnation. This mixture dilutes in a satisfactory manner in hot water but not in cold water, giving a faintly opalescent liquid. The yarn, thread, or netting is impregnated with this liquor and then dried in the air, avoiding temperatures at which the thymol would be driven off. In this way, the fiber is impregnated with the thymol disinfectant and with the soluble soap solution. The fiber is then immersed in a solution of an aluminum salt, such as aluminum acetate in cold water, of such concentration as will give a specific gravity of about 1.025, and the yarn or netting is stirred or agitated to effect thorough impregnation and reaction between the aluminum acetate and the soluble soap. By proceeding in this way, the soluble soap provides a vehicle for distributing the solid thymol in a finely divided precipitated form on to the fiber and it also provides an acid radical, which, when combined by reaction with the metallic element, (i. e. aluminum) produces in situ a metallic soap as a waterproofing agent which is not only on but within the fiber substance itself, and which is effective in holding the disinfectant in a form such that it retains its preservative action over long periods of time.

The procedure above described also has the advantage that it enables an adequate reserve of thymol to be readily deposited in the netting without the use of organic solvents. The limited solubility of thymol in water prevents the use of water solutions for depositing a sufficient quantity of thymol in the netting; but a 2% soap solution such as above described containing about 1% of precipitated thymol in the form of a colloidal suspension enables an amount of thymol to be intimately distributed throughout the netting equal to around ½% or more of the weight of the fiber. The insoluble metallic soap which is subsequently deposited in and on the netting fibers serves somewhat as an adhesive to keep the disinfectant in or in intimate contact with the fiber and to prevent or retard its washing out by the water during the use of the net.

The netting which is thus preserved, in the manners above described, will contain an effective disinfectant intimately distributed throughout the netting fibers and will also contain the waterproofing material likewise intimately distributed in and throughout the netting fibers. The use of such substances as those described enables gill netting to be effectively preserved without objectionable stiffening.

When the thread from which the netting is made is treated before the netting is made, the resulting netting has the advantage that uniformity of impregnation and preservation can be insured, even in those parts of the thread which are subsequently made into knots, which knots might be more difficult to impregnate uniformly, because of their tension, after the netting is made. I do not, however, claim herein specifically the treatment of the thread or the yarn, and the resulting rot-resisting yarn or thread, since that forms the subject of my companion application, Serial No. 568,875, filed Oct. 14, 1931.

I claim:

1. The method of preserving gill netting, which comprises intimately incorporating with the net fibers thymol in effective quantities as a disinfectant and also depositing in and on the fibers an aluminum soap.

2. The method of preserving gill netting, which comprises treating the netting with a colloidal suspension of thymol in a water soluble soap, and subsequently treating the netting with a solution of an aluminum salt to form an insoluble aluminum soap in and on the fibers of the netting.

3. Gill netting preserved by the incorporation therein of thymol and of an insoluble aluminum soap.

4. Gill nets preserved by the presence therein of a solid emulsion of a disinfectant dispersed in an effective waterproofing material which prevents or retards the dissolving or washing off of the disinfectant.

5. Gill nets preserved by the presence therein of a solid emulsion comprising an insoluble soap with a disinfectant dispersed therein.

6. Gill nets preserved by the presence therein of a solid emulsion with a discontinuous phase of thymol dispersed in an insoluble aluminum soap.

7. Gill netting preserved by the presence therein of an insoluble aluminum soap, in which soap a disinfectant that prevents or retards micro-organisms from damaging the fibre substance of the net is incorporated so that the soap prevents or retards the dissolving or washing off of the disinfectant from the fibres.

8. The method of preserving gill netting which comprises treating the netting with a colloidal suspension of a disinfectant in a water soluble soap and subsequently treating the netting with a solution of an aluminum salt to form in situ within and upon the fibres of the netting an insoluble soap within which disinfectant is dispersed as a solid emulsion.

In testimony whereof I affix my signature.

STUART JACKSON HAYES.